UNITED STATES PATENT OFFICE.

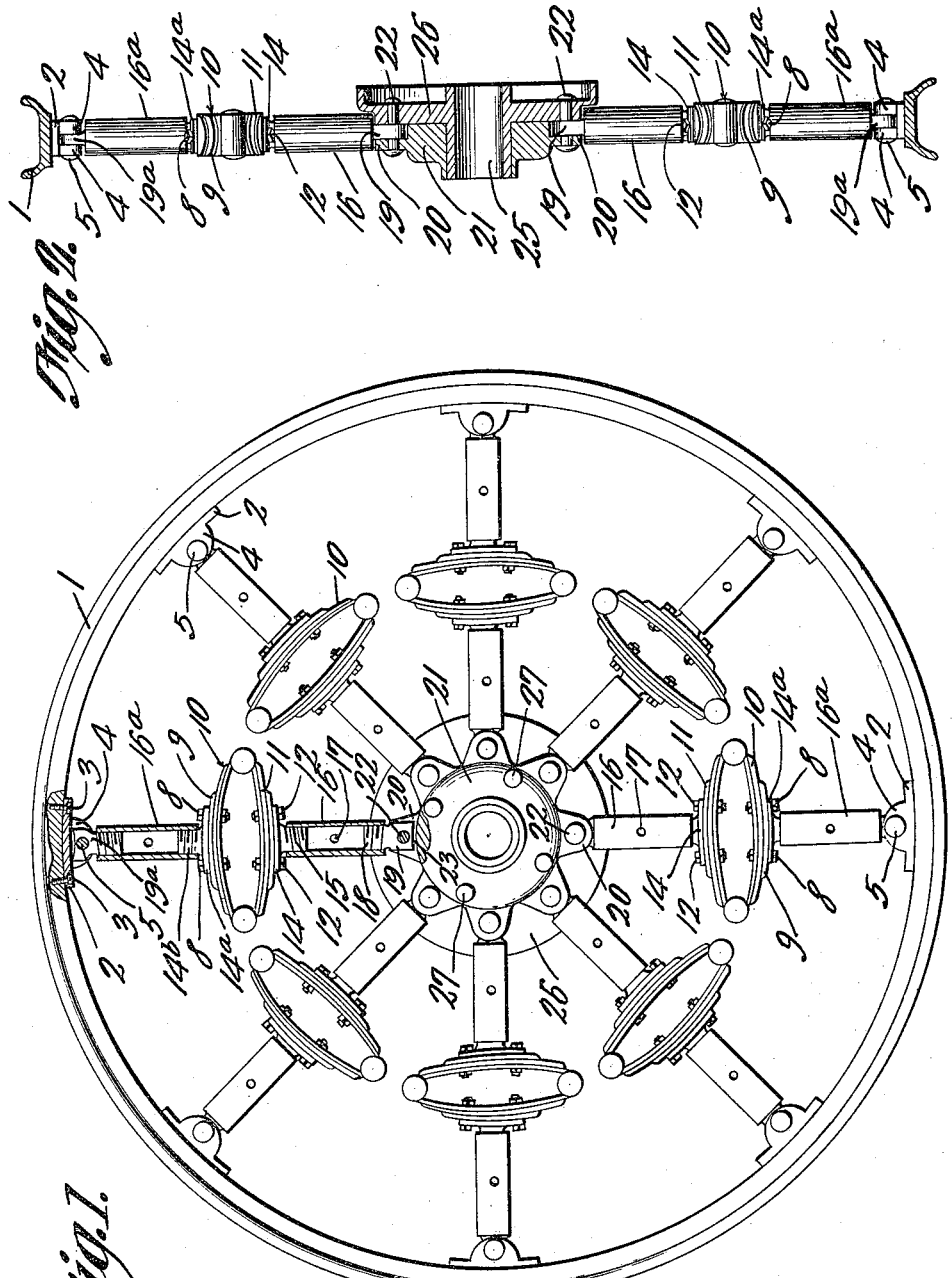

ARTHUR DARBY WACK, OF ST. LOUIS, MISSOURI.

RESILIENT WHEEL.

1,175,027. Specification of Letters Patent. Patented Mar. 14, 1916.

Application filed November 25, 1912, Serial No. 733,466. Renewed January 21, 1916. Serial No. 73,499.

*To all whom it may concern:*

Be it known that I, ARTHUR DARBY WACK, a citizen of the United States, residing at St. Louis, in the State of Missouri, have invented a new and useful Resilient Wheel, of which the following is a specification.

The objects of the present invention are to provide novel means for adjusting the position of the spring of a resilient wheel and to reduce the number of parts in a device of that type.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

In the drawing:—Figure 1 shows in side elevation, a spring wheel constructed in accordance with the present invention, parts being sectioned; and Fig. 2 is a transverse section of the structure shown in Fig. 1.

In the drawing, the numeral 1 indicates a rim which may be of any desired form, the rim 1 being adapted to support a tire (not shown). The tire preferably, although not necessarily, is a non-inflatable one. Attaching members 2 are secured to the rim 1 by means of screws 3, or in any other suitable manner. The attaching members 2 are provided with ears 4, receiving pivot elements 5. The spokes are composite structures and include double convexed springs 10, the inner and outer portions of which are denoted respectively by the numerals 11 and 9. The parts 9 and 11 of the springs 10 may consist of any desired number of laminæ. Bolts 12 or the like connect the inner portions 11 of the springs 10 with plates 14 provided with studs 15, threaded into sleeves 16, the sleeves 16 being provided with openings 17. Studs 18 are threaded into the inner ends of the sleeves 16, the studs 18 and the studs 15 being threaded in opposite directions into the sleeves 16, to the end that when the sleeves 16 are rotated by means of a rod or bar (not shown), thrust into the openings 17, the tension of the springs 10 may be adjusted. The studs 18 terminate in heads 19 located within ears 20 formed upon the hub 21. Pivot elements 22 connect the heads 19 with the ears 20.

Referring to Fig. 1 it will be noted that the inner ends of the heads 19 are spaced from the hub 21, the extremities of the heads 19 being concaved as indicated at 23. The construction, therefore, is such that the spokes, considered generally, may have a slight pivotal movement upon the elements 22. Ultimately, however, the extremities of the concaved end faces 23 will come into contact with the hub 21, thereby limiting the swinging movement of the spokes in the plane of the wheel.

The hub 21 may be mounted upon a bushing 25 carried by a back plate 26, the back plate 26 being connected with the hub 21 by means of the pivot elements 22.

A member 14$^a$, which is a duplicate of the member 14 hereinbefore described is secured by bolts 8 to the other portion 9 of the spring 10 and carries a stud 14$^b$ which is threaded into one end of an auxiliary sleeve 16$^a$. Into the outer end of the sleeve 16$^a$ is threaded a member 19$^a$, which is a duplicate of the member 19, hereinbefore described. The member 19$^a$ is concaved upon its end face and is pivotally supported between the ears 4 on the pivot element 5. The stud 14$^b$ and the member 19$^a$ are threaded in opposite directions.

The spring 10 may be moved bodily inwardly or outwardly by rotating the sleeves 16 and 16$^a$. This feature is of importance when the bowed form of spring is used, since the ends of the respective springs may be so adjusted that they will not strike together in operation. Aside from the spring 10, three different principal parts are used, two like studs 19 and 19$^a$, two like members 14 and 14$^a$ and two like tubes 16 and 16$^a$.

Having thus described the invention, what is claimed is:—

In a wheel, a hub; a rim; a pair of like studs pivoted to the hub and to the rim; a bowed spring extended circumferentially of the wheel; a pair of like studs secured to opposite sides of the spring; and a pair of like tubes located upon opposite sides of the spring; each tube being threaded at its inner end to one stud of the spring, one tube being threaded at its outer end to the stud of the rim and the other tube being threaded at its outer end to the stud of the hub, each tube being right and left hand threaded at its respective ends.

In testimony that I claim the foregoing as my own, I have hereto affixed my signature in the presence of two witnesses.

ARTHUR DARBY WACK.

Witnesses:
G. ENGELMANN,
ARTHUR JOHNSON.

Copies of this patent may be obtained for five cents each, by addressing the "Commissioner of Patents, Washington, D. C.'